United States Patent
Shanmugam et al.

(10) Patent No.: US 10,033,582 B2
(45) Date of Patent: *Jul. 24, 2018

(54) MANAGEMENT AND BEACON SERVICES OF A BEACON SYSTEM

(71) Applicant: Verizon Patent and Licensing Inc., Arlington, VA (US)

(72) Inventors: Sankar Shanmugam, Warren, NJ (US); Madhu Talupur, Warren, NJ (US); Elaine M. Escher, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 38 days.

This patent is subject to a terminal disclaimer.

(21) Appl. No.: 15/435,953

(22) Filed: Feb. 17, 2017

(65) Prior Publication Data
US 2017/0163483 A1    Jun. 8, 2017

Related U.S. Application Data

(63) Continuation of application No. 14/869,078, filed on Sep. 29, 2015, now Pat. No. 9,622,024.

(51) Int. Cl.
*H04B 17/00* (2015.01)
*H04L 12/24* (2006.01)
*H04W 48/10* (2009.01)
*H04W 24/08* (2009.01)
*H04W 4/00* (2018.01)
*H04W 4/80* (2018.01)

(52) U.S. Cl.
CPC ........ *H04L 41/0806* (2013.01); *H04W 24/08* (2013.01); *H04W 48/10* (2013.01); *H04W 4/008* (2013.01); *H04W 4/80* (2018.02)

(58) Field of Classification Search
CPC ..... H04W 4/008; H04W 12/06; H04W 12/04; H04W 4/02; H04W 4/021; H04W 4/023; H04W 4/06; H04W 12/02; H04W 12/08; H04W 24/02; H04W 24/04; H04W 24/08; H04W 40/244; H04W 4/005; H04W 4/028; H04W 64/003; H04W 88/02; G06Q 10/02; G06Q 10/06311; G06Q 10/0635; G06Q 30/0281; G06Q 30/0267; G06Q 20/10; G06Q 20/202; G06Q 20/3224; G06Q 20/327
See application file for complete search history.

(56) References Cited

U.S. PATENT DOCUMENTS

| | | | |
|---|---|---|---|
| 9,363,784 B1* | 6/2016 | Friday .................. | H04W 64/003 |
| 2013/0065584 A1* | 3/2013 | Lyon ..................... | H04W 28/06 |
| | | | 455/434 |
| 2016/0094952 A1* | 3/2016 | Mosher ................ | H04W 4/028 |
| | | | 455/456.1 |
| 2016/0192216 A1* | 6/2016 | Govindarajan .... | G06Q 10/0635 |
| | | | 705/7.28 |

* cited by examiner

*Primary Examiner* — Golam Sorowar

(57) ABSTRACT

A method, a device, and a non-transitory storage medium provides a beacon management service that includes logic that allows a user to configure a beacon system remotely and off-site relative to a location of the beacon system, and a beacon service that provides contextual data to end users based on beacons.

20 Claims, 14 Drawing Sheets

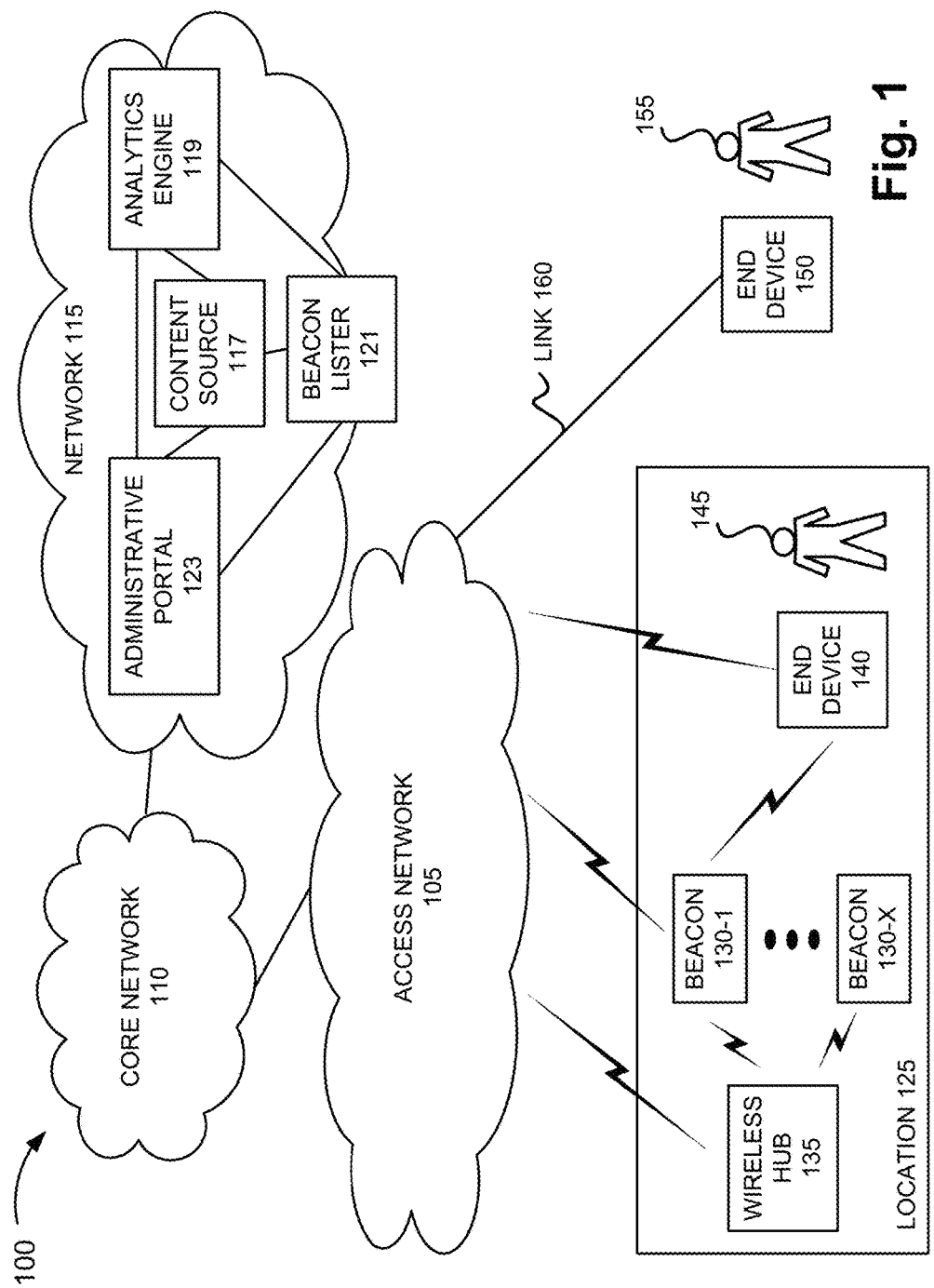

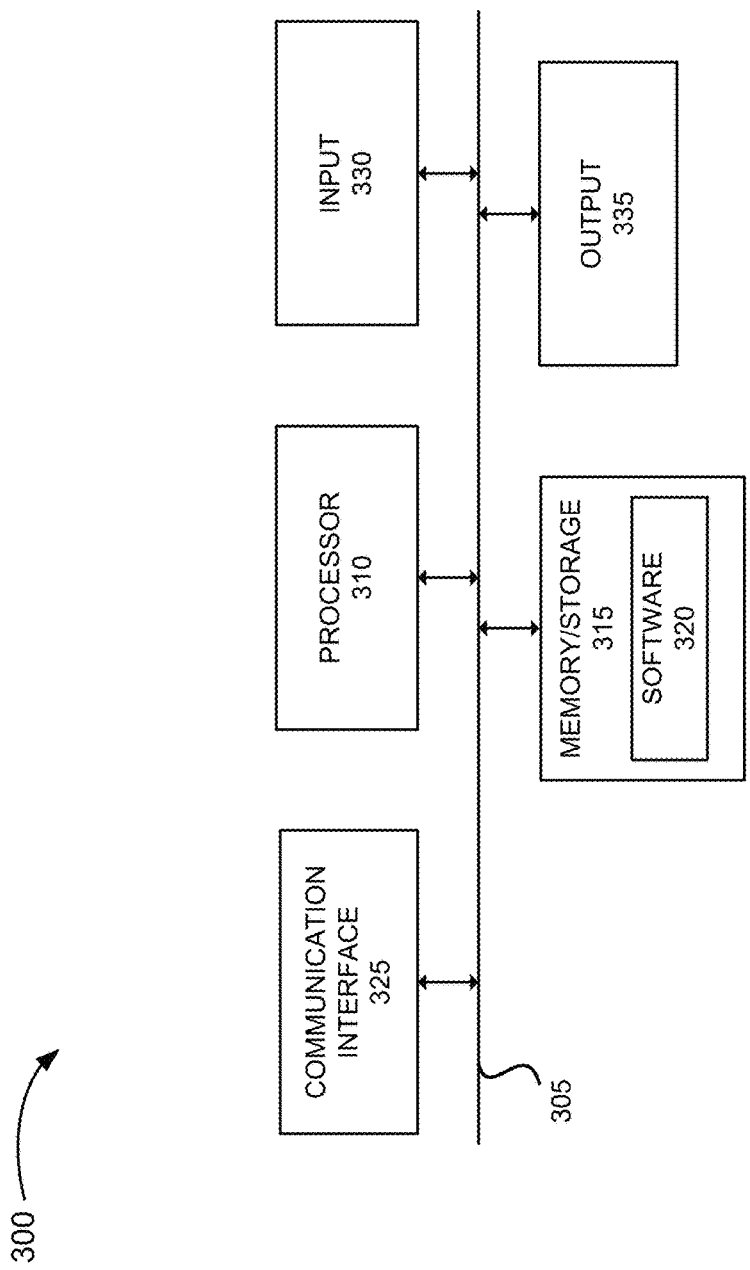

| ANALYTICS TABLE 400 | | | | | | | | |
|---|---|---|---|---|---|---|---|---|
| SUBSCRIBER ID | ANALYTICS DATA | | | | | | ... | ← 406 |
| | | | | | | | | ← 403 |

| LIST TABLE 420 | | | |
|---|---|---|---|
| BEACON IDENTIFIERS | LOCALE | CONTENT TYPE | VENDOR |
| ← 434-1 | ••• | | |
| ← 434-Z | | | |
| ↑ 423 | ↑ 426 | ↑ 429 | ↑ 432 |

MANAGEMENT AND BEACON SERVICES OF A BEACON SYSTEM

CROSS REFERENCE TO RELATED APPLICATION

This application is a continuation of U.S. patent application Ser. No. 14/869,078 filed on Sep. 29, 2015, the disclosure of which is incorporated herein by reference in its entirety.

BACKGROUND

Short range communication is an emerging field of interest. For example, short-range wireless stations (e.g., also known as "beacons") using a wireless technology, such as Bluetooth, are used to determine the locale of a mobile device associated with the user. Based on this locale information, the user may receive various types of data via the mobile device.

BRIEF DESCRIPTION OF THE DRAWINGS

FIG. 1 is a diagram illustrating an exemplary environment in which an exemplary embodiment of a beacon system and services be implemented;

FIG. 3 is a diagram illustrating exemplary components of a device that may correspond to network elements and an end device depicted in the exemplary environment depicted in FIG. 1;

FIG. 4A is a diagram illustrating an exemplary table that stores exemplary analytics data;

FIG. 4B is a diagram illustrating an exemplary table that stores exemplary beacon list data;

DETAILED DESCRIPTION OF PREFERRED EMBODIMENTS

Figure 2A:
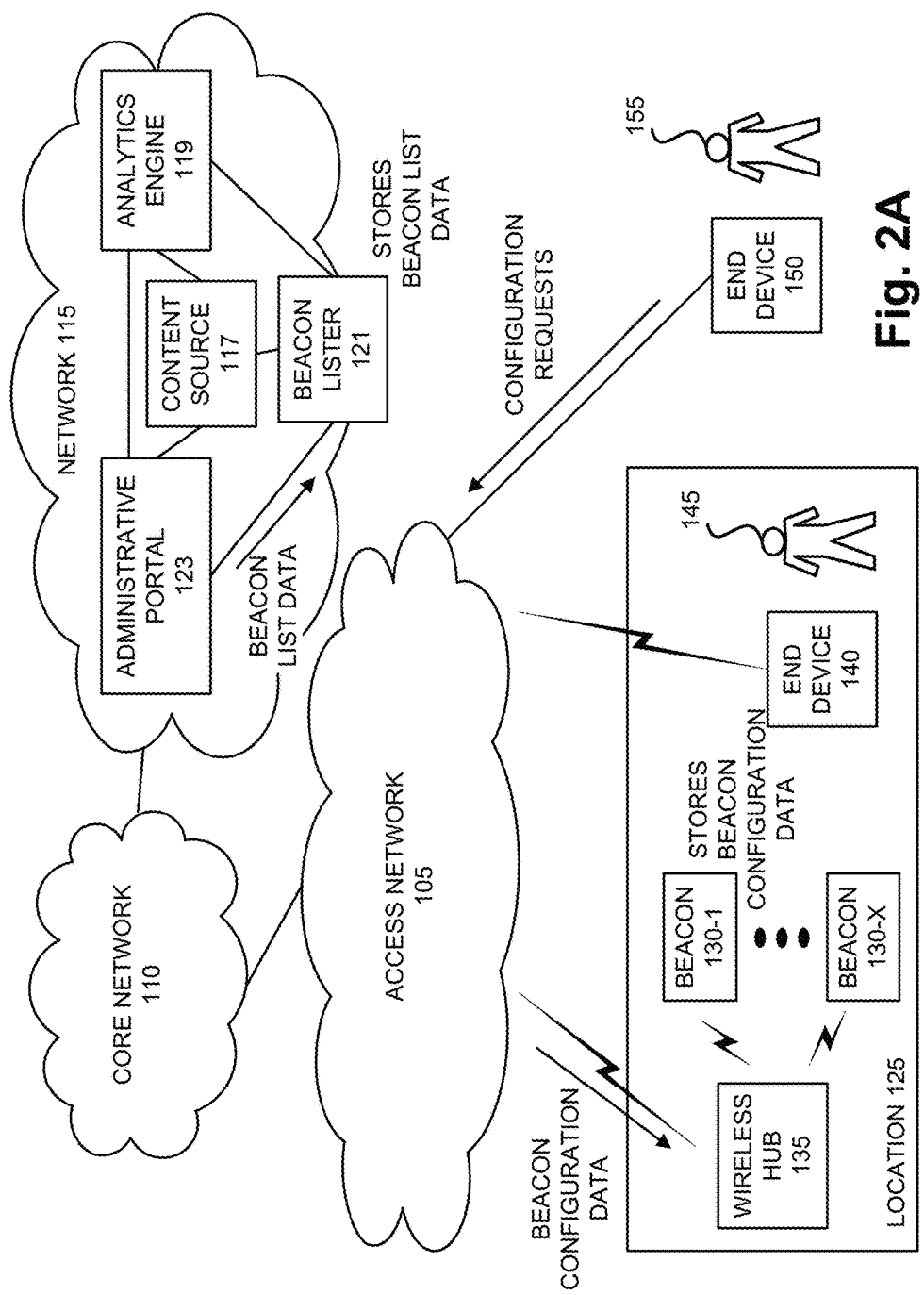
FIGS. 2A-2F are diagrams illustrating an exemplary scenario in which an exemplary embodiment of a management service and a beacon service of a beacon system may be implemented.

The following detailed description refers to the accompanying drawings. The same reference numbers in different drawings may identify the same or similar elements. Also, the following detailed description does not limit the invention.

According to exemplary embodiments, methods, apparatuses, and non-transitory, machine-readable media that store executable instructions pertaining to a beacon system and service are described. According to an exemplary embodiment, the beacon system includes a beacon. According to an exemplary embodiment, the beacon includes an end-device communication interface via which a broadcasting service is provided. According to an exemplary embodiment, the beacon includes a network-side communication interface. According to an exemplary embodiment, the beacon can be configured and managed via the network-side communication interface.

According to an exemplary embodiment, the beacon system includes a wireless hub. The wireless hub is communicatively coupled to the beacon. The wireless hub is also communicatively coupled to a back-end network.

According to an exemplary embodiment, the beacon system includes an administrative portal that provides a management service pertaining to the beacon system. For example, a user of the administrative portal can remotely configure and manage other network elements of the beacon system. By way of further example, the user may transmit an update (e.g., a software update, a firmware update, etc.) to the beacon, configure the identifier of the beacon (e.g., store one or multiple identifiers), configure when and which (e.g., when there are multiple identifiers) identifier the beacon broadcasts, manage security certificates used by the beacon, control and monitor beacon state (e.g., power up the beacon, power down the beacon, etc.), among other management services, as described further below.

According to an exemplary embodiment, the beacon system includes an analytics engine. The analytics engine provides a data analytics service. For example, the analytics engine obtains data from the beacon. The data may pertain to a user of a mobile device, the mobile device, or other data attributable to the user. The analytics engine can perform various tasks, such as analyze the data, identify contextual data, data of interest to the user, data of interest to a third party, etc, among other data analytics services, as described further below.

FIG. 1 is a diagram illustrating an exemplary environment 100 in which an exemplary embodiment of a beacon system may be implemented. As illustrated, environment 100 includes an access network 105, a core network 110, and a network 115. Network 115 includes network elements. The network elements in network 115 include a content source 117, an analytics engine 119, a beacon lister 121, and an administrative portal 123. Environment 100 also includes a location 125. Location 125 includes network elements. The network elements in location 125 include beacons 130-1 through 130-X (also referred to as beacons 130 and, individually or generically as beacon 130) and a wireless hub 135. Location 125 also includes an end device 140 and a user 145. Environment 100 further includes an end device 150 and a user 155. For purposes of description, end device 140 and end device 150 are not considered network elements and are not considered a part of the beacon system.

As further illustrated, communicative links exist between the network elements (although only one is referenced in FIG. 1 as a link 160). A network element may transmit and/or receive data via link 160. Environment 100 may be implemented to include wireless and/or wired (e.g., electrical, optical, etc.) links 150 among the network elements and user device 140. A connection between network elements, between networks, between network element and user device 140, and between end device 150 and a network element may be direct or indirect. For example, an indirect connection may involve an intermediary device or network element, and/or an intermediary network not illustrated in FIG. 1. Additionally, the number, the type (e.g., wired, wireless, etc.), and the arrangement of links 150 illustrated in environment are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, with reference to location 125, there may be multiple instances of wireless hub 135. Additionally, for example, there may be tens, hundreds, or thousands of user devices 140 at location 125. Additionally, in some instances, there may be only a single beacon 130 at location 125. Additionally, for example, there may be multiple instances of content source 117, and so forth.

Additionally, or alternatively, according to other embodiments, multiple network elements may be implemented on a single device, and conversely, a network element may be implemented on multiple devices. For example, administrative portal 123 and analytics engine 119 may be implemented on a single network device or administrative portal and beacon lister 121 may be implemented on a single network device.

Additionally, or alternatively, environment 100 may include an additional network and/or arrangement of networks that is different from that illustrated in FIG. 1. For example, network 105 may be connected to another network (not illustrated). The other network may include other network devices (not illustrated). Additionally, or alternatively, one network may be combined with another network. For example, core network 110 and network 115 may be combined into a single network.

Also, according to other embodiments, one or more functions and/or processes described as being performed by a particular network element may be performed by a different network element or some combination of network elements, which may or may not include the particular network element.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a 3rd Generation (3G) RAN, a 3.5G RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related aspects, such as billing, security, authentication and authorization, network polices, subscriber profiles, etc.

Network 115 may include one or multiple networks of one or multiple types. For example, network 115 may include the Internet, the World Wide Web, an Internet Protocol Multimedia Subsystem (IMS) network, a cloud network, a wide area network (WAN), a metropolitan area network (MAN), a service provider network, a private IP network, some other type of backend network, and so forth. As illustrated, according to an exemplary embodiment, network 115 includes a content source 117, an analytics engine 119, a beacon lister 121, and an administrative portal 123. According to other exemplary embodiments, content source 117, analytics engine 119, beacon lister 121, and/or administrative portal 123 may be implemented in core network 110.

Content source 117 includes a network device that stores contextual content. For example, content source 130 may be implemented as an application server, a web site, a streaming server, a file server, an ad server, a vendor's server, or the like. Contextual content may include any type of data, information, multimedia, and/or advertisement, which may be targeted to user 145 based on his or her proximity to beacon 130.

Analytics engine 119 includes a network device that provides a data analytics service. For example, analytics engine 119 may include logic to perform various tasks, such as data preprocessing, statistical analysis, predictive analysis, data collection (e.g., from a source outside of the beacon system, such as the Internet, the Web, etc.), data mining, data dredging, and so forth. Additionally, for example, analytics engine 119 may include logic to perform machine learning and/or artificial intelligence tasks. Analytics engine 119 may use well-known or conventional algorithms to perform these tasks. Alternatively, analytics engine 119 may use proprietary algorithms. Analytics engine 119 may obtain data using a push and/or pull methods.

According to an exemplary implementation, analytics engine 119 obtains data pertaining to any communication between beacon 130 and end device 140. For example, when end device 140 is in proximity to beacon 130 and receives a broadcast, end device 140 may ping beacon 130. The ping data may include an end device identifier and/or another type of identifier that is attributable to end device 140 and/or user 145. Beacon 130 may store the ping data. The ping data is obtained by analytics engine 119. The ping data may be mapped to a beacon identifier of beacon 130, which in turn may be mapped to a location, a time, a beacon-enabled application of end device 140, etc. Analytics engine 119 may store this data as analytics data and/or use this data as a seed to perform various other tasks (e.g., data collection, data mining, etc.), which may result in additional data being collected, generated, etc.

Additionally, or alternatively, analytics engine 119 obtains data pertaining to any communication between end device 140 and content source 117. For example, when end device 140 receives and is presented with contextual content, user 145 may select, purchase, browse, download, stream, etc., an item, a product, a service, a coupon, etc. Analytics engine 119 may store this data as analytics data and/or use this data as a seed to perform various other tasks (e.g., data collection, data mining, etc.), which may result in additional data being collected, generated, etc. Analytics engine 119 may store the analytics data in any suitable form (e.g., a data structure, a file, a database, etc.). A user of the management system or a beacon service provider may monetize this data, use the analytics data to select, provide, etc., additional contextual content, and so forth.

FIG. 4A is a diagram that illustrates an exemplary analytics table 400. As illustrated, analytics table 400 includes a subscriber identifier field 403 and an analytics data field 406. According to this example, table 400 includes analytics profiles 408-1 through 408-Y (also referred to as profiles 408 and, individually and/or generically as profile 408). For example, analytics profile 408 is a mapping between a subscriber of the beacon management service and analytics data generated, compiled, and/or obtained from the beacon management service. According to other implementations, analytics table 400 may include additional and/or different types of data. Subscriber identifier field 403 stores a unique identifier of a subscriber to the beacon management service. Analytics data field 406 stores analytics data that is obtained, generated (e.g., from a data mining task), collected from various sources (e.g., third party, Internet, social web sites, etc.), and/or compiled. The analytics data may include a mapping between analytics data and, end device 140 and/or user 145.

Beacon lister 121 includes a network device that stores a list of beacons. The list of beacons pertains to a particular beacon management service subscriber (e.g., user 155) and/or a particular beacon-enabled application resident on end device 140. For example, beacon lister 121 may store beacon lists pertaining to various vendors, retailers, merchants, businesses, and so forth. The beacon list includes a listing of each unique identifier of beacon 130 that is currently in service (e.g., broadcasting) on behalf of an entity (e.g., a vendor, etc.) within a locale. Beacon lister 121 may be implemented as a server device. Beacon lister 121 may store a beacon list in any suitable form (e.g., a data structure, a file, a database, etc.).

Referring to FIG. 4B, beacon lister 121 stores exemplary beacon list data in a table 420. As illustrated, table 420 includes a beacon identifiers field 423. Optionally, table 420 may include additional fields. For example, table 420 may also include a locale field 426, a content type field 429, and/or a vendor field 432. Table 420 may include profiles 434-1 through 434-Z (also referred to as profiles 434 and, individually and/or generically as profile 434). Each profile 434 may include at least one instance of data that is different from another profile 434. A user of administrative portal 123 may configure beacon list data via a graphical user interface provided by administrative portal 123.

Beacon identifiers field 423 stores a list of unique identifiers of beacons 130. According to one exemplary implementation, the unique identifier of beacon 130 includes a conventional identification schema (e.g., a UUID, a major value, and a minor value). According to another exemplary implementation, another form or proprietary form of identification schema may be used. The unique identifier of beacon 130 includes a value that is unique relative to other beacons 130. The unique identifier of beacon 130 may also comprise other sub-values for purposes of identifying a subset of beacons, etc.

Locale field 426 stores locale data that indicates a locale (e.g., location 125) at which beacons 130 are located. Various types of locale data may be used, which vary in terms of specificity, nomenclature, etc. For example, locale data may include an address (e.g., country, state, county, city, street address, zip code), an area within a building (e.g., a floor number, a name of a department, etc.), a business name (e.g., ABC company, etc.), an area within a transportation hub (e.g., a platform number at a train station, a terminal name at an airport, an airline name and a gate number, etc.), an area within a sports stadium (e.g., level 1, VIP area, etc.), a name of place (e.g., ABC landmark, XYZ sports stadium, etc.), GPS coordinates, and so forth.

Content type field 429 stores data that indicates a type of contextual content and/or a uniform resource identifier (URI) at which end device 140 obtains contextual content. For example, according to one exemplary implementation in which beacon 130 also transmits advertisement data, context type field 429 may indicate a category of product or service, a product or service, etc., being advertised. That is, some beacons 130 may be configured to broadcast certain advertisement data pertaining to one category of product or a particular product, while other beacons 130 may be configured to broadcast certain data pertaining to another category of product or another product. Additionally, or alternatively, content type field 429 may store a URI. For example, the URI is a network address from which contextual content may be obtained at content source 117 by user 145 via end device 140. Alternatively, when advertisement data is also broadcasted with the unique identifier of beacon 130, the URI is a network address from which particular contextual content pertaining to the advertisement data may be obtained at content source 117 by user 145 via end device 140.

Vendor field 432 stores data that indicates a vendor or other type of entity. For example, vendor field 432 may store a name of a vendor to which the beacon identifiers are assigned. By way of further example, as previously described, one or more beacons 130 may each store one or more beacon identifiers. In this way, multiple vendors may configure a same beacon 130 such that the same beacon 130 may broadcast multiple beacon identifiers, multiple URIs, multiple advertisements, and so forth pertaining to the multiple vendors. The vendor may be, for example, any user or entity, having an interest in and/or control of the contextual content. Additionally, or alternatively, the vendor may have an interest in and/or control of beacons 130 and/or any other network element of the beacon system. According to other implementations, the beacon list data may include additional instances of data, fewer instances of data, and/or different types of data.

Referring back to FIG. 1, administrative portal 123 includes a network device that provides the management service pertaining to the beacon system and service. A user of the management service (e.g., user 155) may manage beacons 130 and other network elements (e.g., beacon lister 121, etc.) of a beacon system via administrative portal 123 and via end device 150. Administrative portal 123 may provide various management services, as described herein, such that the user may manually configure a network element on-the-fly. Additionally, or alternatively, administrative portal 123 may allow the user to configure a network element in an automated manner based on a management schedule. For example, the user may configure a time schedule during which beacon configuration data pertaining to one or multiple beacons 130 is/are updated. Thereafter, beacon 130 may broadcast a unique beacon identifier that is different from the unique beacon identifier previously broadcasted. Other network elements of the beacon system may also be configured in an automated manner based on the management schedule.

Figure 4C:
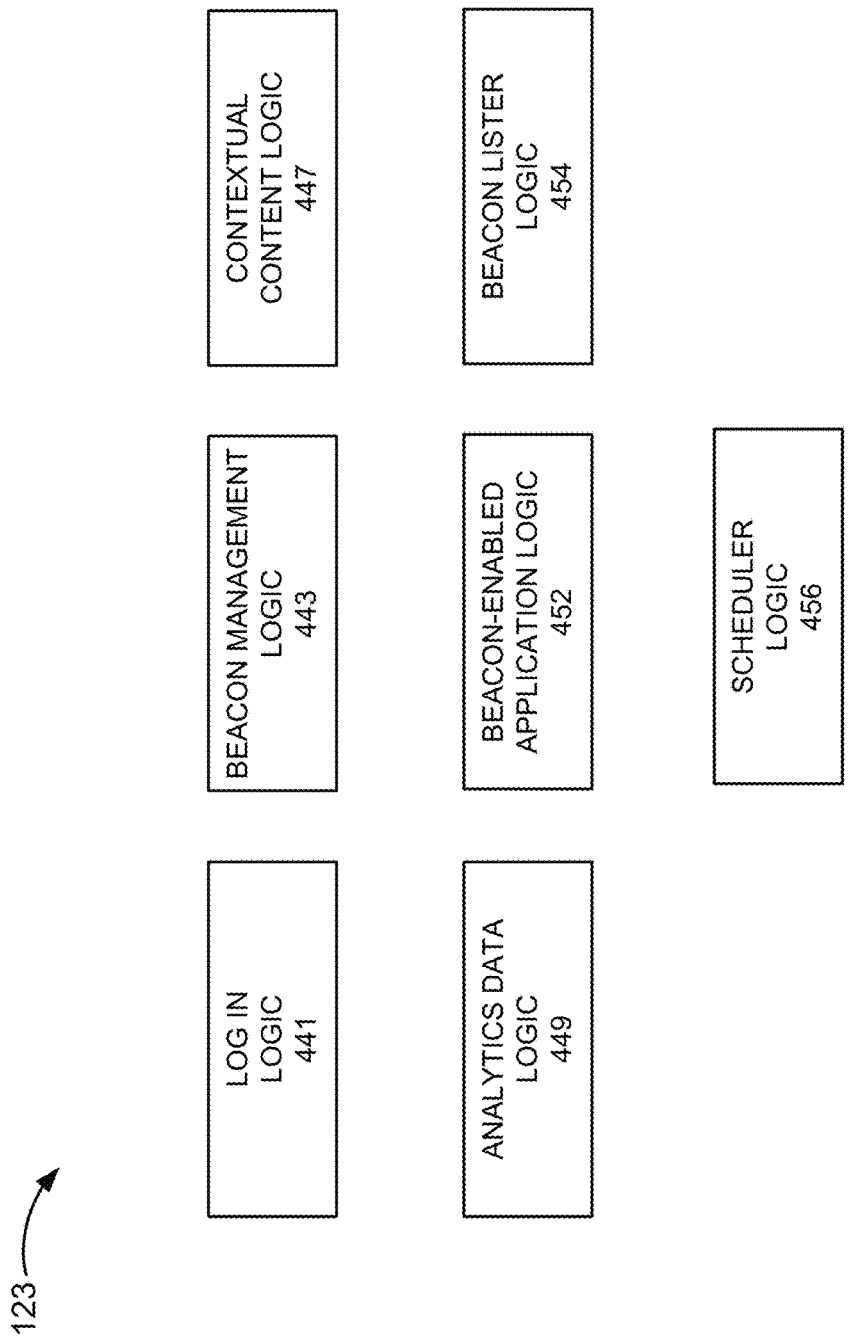
FIG. 4C is a diagram illustrating exemplary functional components of an administrative portal that provides the management service.

FIG. 4C is a diagram illustrating exemplary functional components of administrative portal 123. For example, as illustrated, administrative portal 123 includes log in logic 441, beacon management logic 443, contextual content logic 447, analytics data logic 449, beacon-enabled application logic 452, beacon lister logic 454, and scheduler logic 456. According to other exemplary embodiments, administrative portal 123 may include additional, fewer, and/or different functional components than those illustrated in FIG. 4C and described herein. Each of log in logic 441, beacon management logic 443, contextual content logic 447, analytics logic 449, beacon-enabled application logic 452, beacon lister logic 454, and scheduler logic 456 provides a graphical user interface that allows a beacon management service subscriber (e.g., user 155) to use the various management services and perform various tasks as described herein.

Log in logic 441 includes logic that provides a log in service. For example, log in logic 441 performs authentication and authorization. As an example, user 155 may enter a user name and password, which is subsequently validated or not. The management service may include an on-boarding process for a new user that includes configuration and assignment of user credentials. Log in logic 441 stores these user credentials and uses the user credentials for comparison. Log in logic 441 may also provide other well-known communication services pertaining to security, such as encryption, secure connection, and so forth.

Beacon management logic 443 includes logic that provides a management service pertaining to beacons 130. For example, user 155 may configure beacon configuration data. The beacon configuration data may include a unique beacon identifier stored on each beacon 130, the number of beacon identifiers stored on each beacon 130 (e.g., one beacon identifier or multiple beacon identifiers), the number of beacon identifiers broadcasted during each broadcast instance (e.g., one beacon identifier or multiple beacon identifiers), and various other broadcast parameters described herein (e.g., transmit power, time period of broadcast, time interval between each broadcast, advertisement data, etc.). Additionally, for example, user 155 may configure the logic (e.g., executable software) at beacon 130, keep track of a version of the logic installed at beacon 130, and update the logic at beacon 130. User 155 may also control the state of beacon 130. For example, user 155 may power up and power down beacon 130 and monitor various states (e.g., battery replacement state (e.g., remaining life of battery), a failure state (e.g., boot-up failure, etc.), an active state (e.g., turned on or power on), an inactive state (e.g., turned off or power off), etc.). For example, user 155 may identify maintenance issues, a non-functioning beacon 130, and so forth.

Contextual content logic 447 includes logic that provides a management service pertaining to content source 117. For example, user 155 may on-board contextual content to content source 117, update the contextual content, and so forth. User 155 may assign URIs to contextual data and mappings of locations at which end device 140 and user 145 are located relative to locations of beacons 130 so as to provide particular contextual content.

Analytics data logic 449 includes logic that provides a management service pertaining to analytics engine 119. For example, user 155 may on-board logic to analytics engine 119, select the types of analytics data to be provided, and/or manage how the analytics data is used.

Beacon-enabled application logic 452 includes logic that provides a management service pertaining to a beacon-enabled application. For example, as described further below, end device 140 includes a beacon-enabled application that allows user 145 to receive the beacon service. Beacon-enabled application logic 452 allows user 155 to manage the beacon-enabled application, such as on-boarding an update to the beacon-enabled application, providing an over-the-air update service for updating the beacon-enabled application to end devices 140, and so forth.

Beacon lister logic 454 includes logic that provides a management service pertaining to beacon lister 121. For example, beacon lister logic 454 allows user 155 to manage beacon list data stored in beacon lister 121. For example, user 155 may configure which beacon identifiers are provided to end device 140. Depending on the implementation of the beacon list data, user 155 may configure other instances of beacon list data. For example, locale data may provide an added level of granularity, relative to the beacon identifier, to provide certain contextual content to user 145. According to an exemplary scenario, user 155 may configure a beacon list that only includes a portion of a network of beacons 130 versus all of the beacons 130 of a beacon network. For example, the portion of the network of beacons 130 may be different or a portion of beacons 130 that share the same major value included in the beacon identifiers. Additionally, for example, user 155 may configure different URIs of contextual content depending on attributes of user 145, which may stem from the analytics data, in addition to the specific location of user 145 relative to a particular beacon 130 within the beacon network including multiple beacons 130.

Scheduler logic 456 includes logic that provides a scheduling service relative to the management services described herein. For example, user 155 may configure a schedule for a configuration to be performed. This is in contrast to a configuration being performed on-the-fly as user 155 confirms entry of the configuration data. In this way, user 155 may automate the configuration of any network element in the beacon system, which may subsequently occur on a certain date, time, and locale. The graphical user interface may include various graphical elements from which user 155 may select, such as the type of network element to which the schedule pertains (e.g., beacon 130, content source 117, etc.). In the case of beacons 130, when user 155 wishes to re-configure only a portion of beacons 130, user 155 may specify only certain beacons 130 (e.g., entering beacon identifiers). Scheduler logic 456 stores a schedule created by the user. The schedule is made available to other functional components of administrative portal 123 so that configurations or updates may be executed according to the scheduled specified by user 155. The schedule may indicate any future date and time. For example, the date and the time may be a date and a time subsequent to the user logging off the administrative portal 123, one or multiple days, weeks, months, and so forth from the date and the time user 155 logs off administrative portal 123.

Referring back to FIG. 1, location 125 is a geographic locale. Location 125 may be an indoor location, an outdoor location, a public location, a private location, a place of business, and so forth. For example, location 125 may be a retail location (e.g., a shopping mall, a retail store, a grocery store, etc.), a transportation location (e.g., a train station, an airport, a bus station, etc.), an entertainment location (e.g., a movie theater, a museum, a park, a restaurant, a sports stadium, etc.), a business location (e.g., a bank, a hotel, etc.), a parking garage, and so forth. Beacon 130 may be installed or situated at location 125.

Beacon 130 includes a communication node that provides a broadcasting service. According to an exemplary implementation, beacon 130 is a stationary device or situated at a fixed location. According to other exemplary implementations, beacon 130 may have mobility (e.g., a beacon attached to a drone or other type of device having mobility, a mobile beacon device, etc.). For example, the mobile beacon device may be configured to roam within a defined geographical area so that its general location may be known. Beacon 130 may be powered by an internal source, an external source, a battery, an outlet, electromagnetic waves, and so forth.

According to an exemplary embodiment, beacon 130 includes an end-device communication interface via which data is broadcasted to end device 140. The end-device communication interface may be implemented to include one or multiple technologies including, for example, Bluetooth (e.g., Bluetooth Low Energy (BLE), Bluetooth Classic, etc.), Wi-Fi, optical wireless (e.g., Infrared (IR) (e.g., legacy, second generation Infrared), etc.), radio frequency identification (RFID), ZigBee, ultra wideband (UWB), low frequency radio frequency (RF), or another type of known or future generation, short-range communication technology.

According to an exemplary embodiment, beacon 130 includes a network-side communication interface. According to an exemplary embodiment, beacon 130 can be configured and managed via the network-side communication interface. The network-side communication interface may be implemented to one or multiple wireless technologies, such as those described above (e.g., LTE, LTE-A, GSM, UMB, WiMax, etc.) or another type of known or future generation wireless technology not specifically mentioned. According to an exemplary implementation, beacon 130 communicates to access network 105, core network 110, network 115, administrative portal 123 and analytics engine 119 via the network-side communication interface. According to another exemplary implementation, beacon 130 communicates to access network 105, etc., via the network-side communication interface and wireless hub 135.

According to an exemplary embodiment, beacon 130 includes logic that provides a broadcasting service. The broadcasting service includes beacon 130 transmitting a unique identifier of beacon 130 via the end-device communication interface. According to an exemplary implementation, the unique identifier includes a UUID, a major value, and a minor value. For example, the UUID may be a string having a value that differentiates a group or a network of beacons from another group or another network of beacons. The UUID may be a 16-byte string or other suitable length. The major value may be a string having a value that differentiates a subset of beacons 130 within the group or the network of beacons. The major value may be a 2-byte string or other suitable length. The minor value may be a string having a value that differentiates a beacon from any other beacon within the group or the network of beacons. The minor value may be a 2-byte string or other suitable length. As an example, beacons 130 of a beacon network may all share the same UUID. Beacons 130 of a department in the store (e.g., mens clothing department, electronics department, etc) may all share the same major value. Additionally, each beacon in a given department may have a unique minor value. According to other exemplary implementations, beacon 130 may use another form of identification schema, other types of data (e.g., Media Access address, an equipment identifier, a beacon serial number, etc.), different string length, additional or fewer strings, and so forth.

Beacon 130 may store broadcast parameters that are configurable. For example, the broadcast parameters include the unique identifier, transmit power, time period of broadcast (e.g., 100 milliseconds, 1 second, etc.), time interval between each broadcast (e.g., continuous, every 2 seconds, etc.), and so forth. According to one implementation, beacon 130 may also broadcast advertisement data. The advertisement data is configurable. Depending on whether beacon 130 is battery-powered or not, a broadcast parameter value may vary greatly. According to some implementations, beacon 130 may include a Global Positioning System (GPS) chipset, which may facilitate the location of beacon 130.

Wireless hub 135 includes a communicative and computational device. For example, wireless hub 135 may be implemented as a wireless router (e.g., a broadband router, a Wi-Fi router, etc.) or other type of intermediary access point to access network 105.

End device 140 includes a communicative and computational device. End device 140 may be implemented as a mobile device or a portable device. By way of example, end device 140 may be implemented as a smartphone, a tablet, a phablet, a netbook, a computer (e.g., a laptop, a palmtop, etc.), a personal digital assistant, or a wearable device (e.g., a watch, glasses, armband, etc.). End device 140 may store one or multiple applications. For example, end device 140 may include a telephone application, a multi-media application, an e-mail application, a contacts application, a calendar application, an instant messaging application, a web browsing application, a location-based application (e.g., a Global Positioning System (GPS)-based application, etc.), a social networking application, a camera application, a toolbar application, and so forth.

End device 140 includes a beacon-enabled application. The beacon-enabled application includes logic to use the broadcast service of beacon 130 and obtain contextual content. According to one example, the beacon-enabled application may be implemented as a stand-alone application. According to another example, the beacon-enabled application may be implemented as a plug-in to an existing application (e.g., a communications application, a web browser, etc.) or a form of an update to an existing application resident on end device 140. The beacon-enabled application may be pre-installed on end device 140 or downloaded from a remote source (e.g., a server) by user 145. Beacon-enabled application may operate as a daemon application or other form of a background-running application. The beacon-enabled application may provide user preferences. The beacon-enabled application is further described herein.

User 145 is an operator of end device 140. User 145 receives a beacon service provided by the beacon system. For example, user 145 may be a consumer, etc.

End device 150 includes a communicative and computational device. End device 150 may be implemented as a mobile device, a portable device, or a stationary device. For example, end device 150 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 150 provides access to various network elements in network 115, such as beacon lister 121, administrative portal 123, and so forth. User 155 is an operator of end device 150 and subscriber to the beacon management service. For example, user 155 may be a network administrator, a third party (e.g., a vendor, a merchant), and so forth. User 155 may manage beacons 130 and other network elements of the beacon system "off-site" relative to location 125. For example, location 125 may be in the state of Virginia and user 155 may be situated in California.

Link 160 provides a communication path between network elements, networks, and/or a network element and end devices 140/150. Link 160 may have certain characteristics, such as bandwidth capacity, transmission data rate, and the like.

FIGS. 2A-2F are diagrams illustrating an exemplary embodiment of the management service and the beacon service in relation to an exemplary scenario. According to this exemplary embodiment, the beacon system includes, among other network elements, wireless hub 135. According to other exemplary embodiments, the beacon system may not include wireless hub 135.

Referring to FIG. 2A, assume user 155 wishes to remotely configure a beacon network (e.g., beacons 130) located at location 125 via end device 150. User 155 establishes a session with administrative portal 123 via end device 150. Log in logic 441 of administrative portal 123 presents a graphical user interface to enable user 155 to log in to the management service. User 155 enters a user name and password via the graphical user interface. Log in logic 441 determines that user's 155 sign on data is valid and user 155 is granted access to administrative portal 123. User 155 is presented with a graphical user interface that includes interfaces from which user 155 can select and configure the beacon system. According to this exemplary scenario, assume beacons 130 are newly installed and user 155 wishes to remotely configure each of beacons 130. User 155 interacts with the graphical user interface and beacon management logic 443 provides a graphical user interface that allows user 155 to configure beacons 130. For example, user 155 may wish to the beacon identifiers of beacons 130. User 155 selects the beacon network (e.g., beacons 130) and location (e.g., location 125) and enters one or multiple beacon identifiers for each beacon 130. According to some situations, user 155 may configure a single beacon identifier for each beacon 130. According to other situations, user 155 may configure each beacon 130 to store multiple beacon identifiers. In either case, the beacon identifier may pertain to a beacon-enabled application. The beacon-enabled application may be associated with a particular entity, such as a car manufacturer, a retail chain, or some other type of vendor. Thus, depending on the implementation, beacon 130 may store multiple beacon identifiers that pertain to multiple and different beacon-enabled applications (e.g., XYZ company and ABC company) or store a single beacon identifier that pertains to one beacon-enabled application (e.g., DEF company). User 155 confirms his or her entries of beacon identifiers.

User 155 may also configure other beacon configuration data, such as the broadcast parameters (e.g., transmit power, time period of broadcast, time interval between each broadcast, etc.), the advertisement data, and/or the logic. Upon completion of receiving beacon configuration data, administrative portal 123 transmits the beacon configuration data to beacons 130 via wireless hub 135. Beacons 130 stores and/or updates the configuration of beacons 130 based on the received beacon configuration data.

User 155 also wishes to configure beacon lister 121. For example, user 155 interacts with the graphical user interface and beacon lister logic 454 provides another graphical user interface that allows user 155 to configure beacon lister 121. Depending on the implementation, beacon lister 121 may be configured in various ways and store different types of beacon list data. For example, the graphical user interface allows user 155 to enter the unique beacon identifiers assigned to beacons 130. The graphical user interface may also allow user 155 to enter other types of beacon list data, such as the locale (e.g., location 125) at which beacons 130 are situated, content metadata (e.g., a category of a product or service associated with the contextual content; a product or a service pertaining to the contextual content; a category, a product, a service advertised by beacons 130, etc.); one or multiple URIs associated with the contextual content stored by content source 117, and/or entity information (e.g., a vendor's name, etc.). User 155 confirms his or her entries. Upon receiving the beacon list data, administrative portal 123 transmits the beacon list data to beacon lister 121. Beacon lister 121 stores and/or updates the configurations of beacon lister 121 based on the received beacon list data.

Figure 2B:
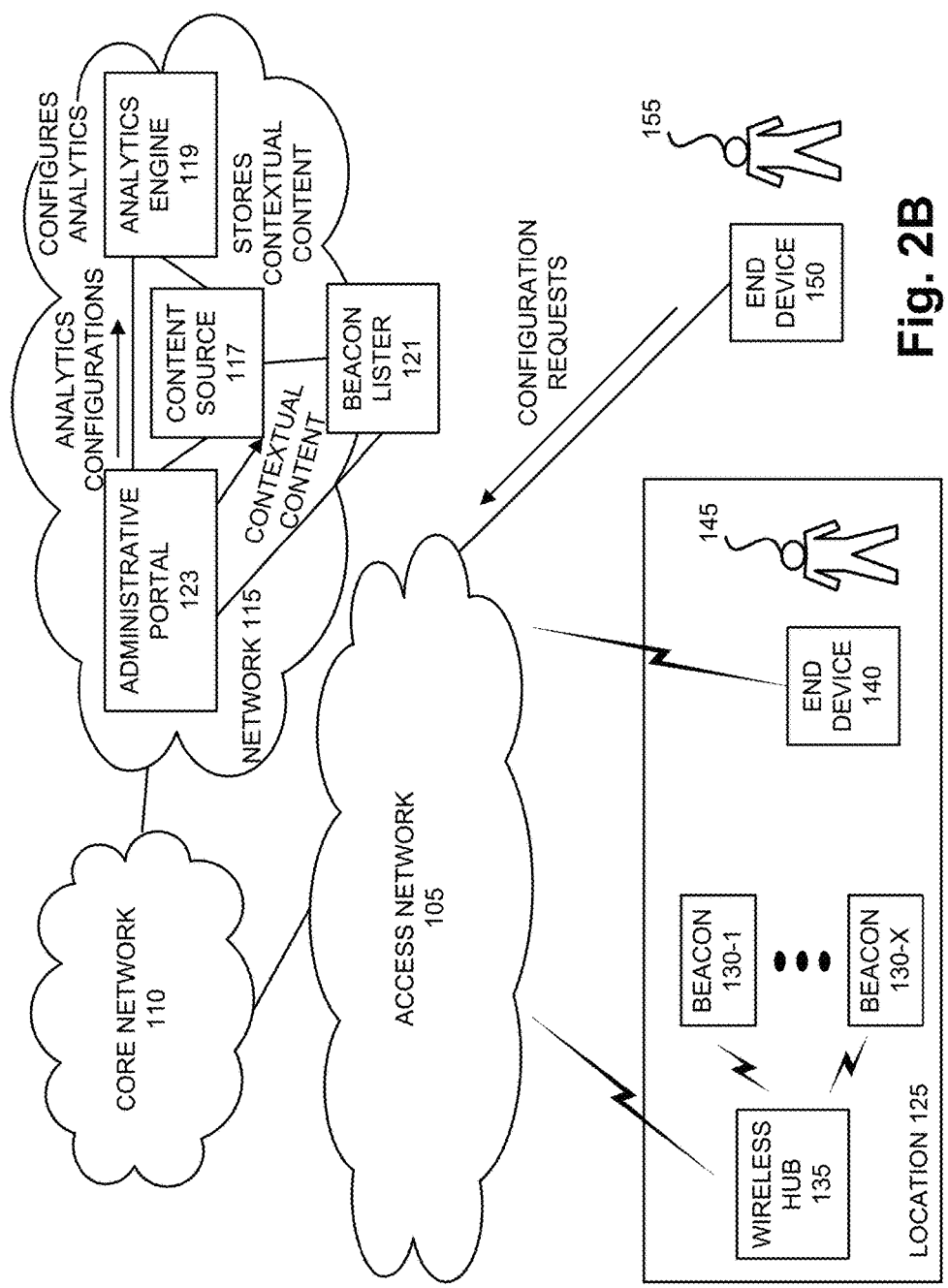

Referring to FIG. 2B, user 155 may perform other configurations via administrative portal 123. For example, user 155 wishes to configure content source 117. User 155 interacts with the graphical user interface presented by administrative portal 123 and contextual content logic 447 provides a graphical user interface that allows user 155 to configure content source 117. For example, user 155 may on-board various contextual content to content source 117. Content source 117 stores the contextual content configured by user 155.

Additionally, user 155 wishes to configure analytics engine 119. User 155 interacts with the graphical user interface presented by administrative portal 123 and analytics data logic 449 provides a graphical user interface that allows user 155 to configure analytics engine 119. For example, user 155 may select logic used by analytics engine 119. By way of further example, the graphical user interface may present various options from which user 155 may select, such as various algorithms used by and/or services (e.g., statistical analysis, data collection, data mining, etc.) performed by analytics engine 119. Additionally, or alternatively, user 155 may select the type of analytics data to be provided. For example, user 155 may wish analytics engine 119 to track the number of users 145 entering a particular location, how long users 145 stay at a particular location, user behavior when presented with contextual content, and so forth. In this way, user 155 may specify analytics data that is beneficial to a particular business need. Administrative portal 123 transmits the analytics configurations to analytics engine 119. Analytics engine 119 configures its analytics services according to the received analytics configuration data.

Although not illustrated, user 155 may also configure certain features pertaining to beacon-enabled applications resident on end devices 140. For example, beacon-enabled application logic 452 may present a graphical user interface that allows user 155 to on-board an update to a beacon-enabled application. Users 145 may download the update (e.g., a new version, etc.) or an over-the-air update may be automated by the beacon-enabled application at end device 140.

Figure 2C:
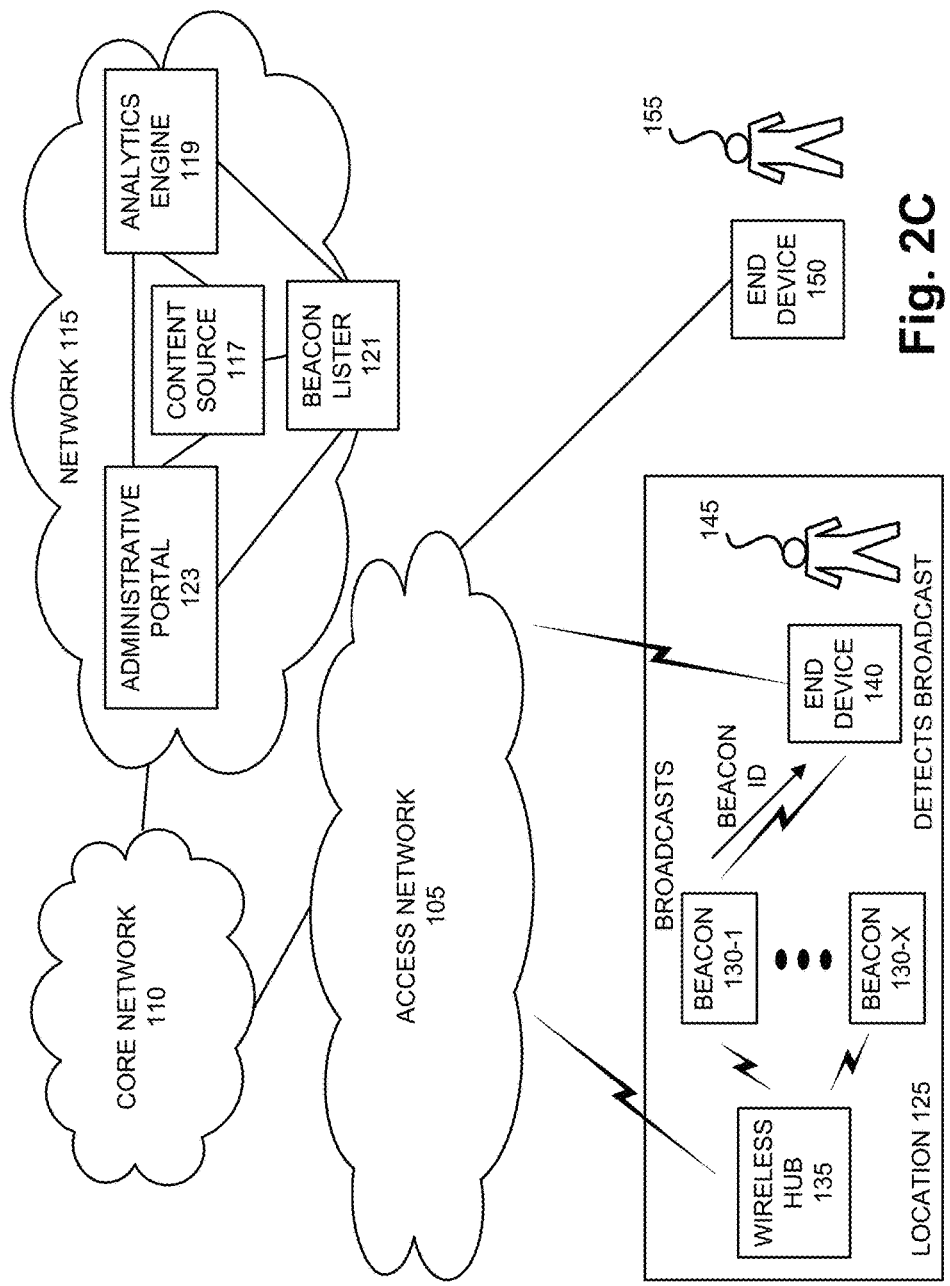

Referring to FIG. 2C, assume subsequent to the configuration of the beacon system, user 145 enters location 125 with end device 140. Beacon 130-1 broadcasts its beacon identifier. According to an exemplary implementation, beacon 130-1 may be configured based on the BLE Specification defined in version 4.2 of the Bluetooth Specification (adopted Dec. 2, 2104) and/or the Core Specification Supplement (CSS)v6 (adopted Jul. 14, 2015), each of which is incorporated in its entirety by reference. According to other exemplary implementations, beacon 130-1 may be configured based on another specification (e.g., AltBeacon specification, etc.) or a proprietary specification. According to one exemplary implementation, beacon 130-1 broadcasts multiple beacon identifiers, which may be directed to different beacon-enabled applications, during or within a single broadcast instance or transmission. Additionally, or alternatively, for example, beacon 130-1 may broadcast, in addition to the beacon identifier(s), advertising data (e.g., a coupon, a promotion, a URI, etc.) pertaining to one or multiple entities (e.g., vendors). For example, the URI may pertain to beacon lister 121. Additionally, or alternatively, the URI may pertain to contextual content that may be obtained at content source 117. Beacon 130-1 performs the broadcast service based on the beacon configuration data.

Figure 2D:
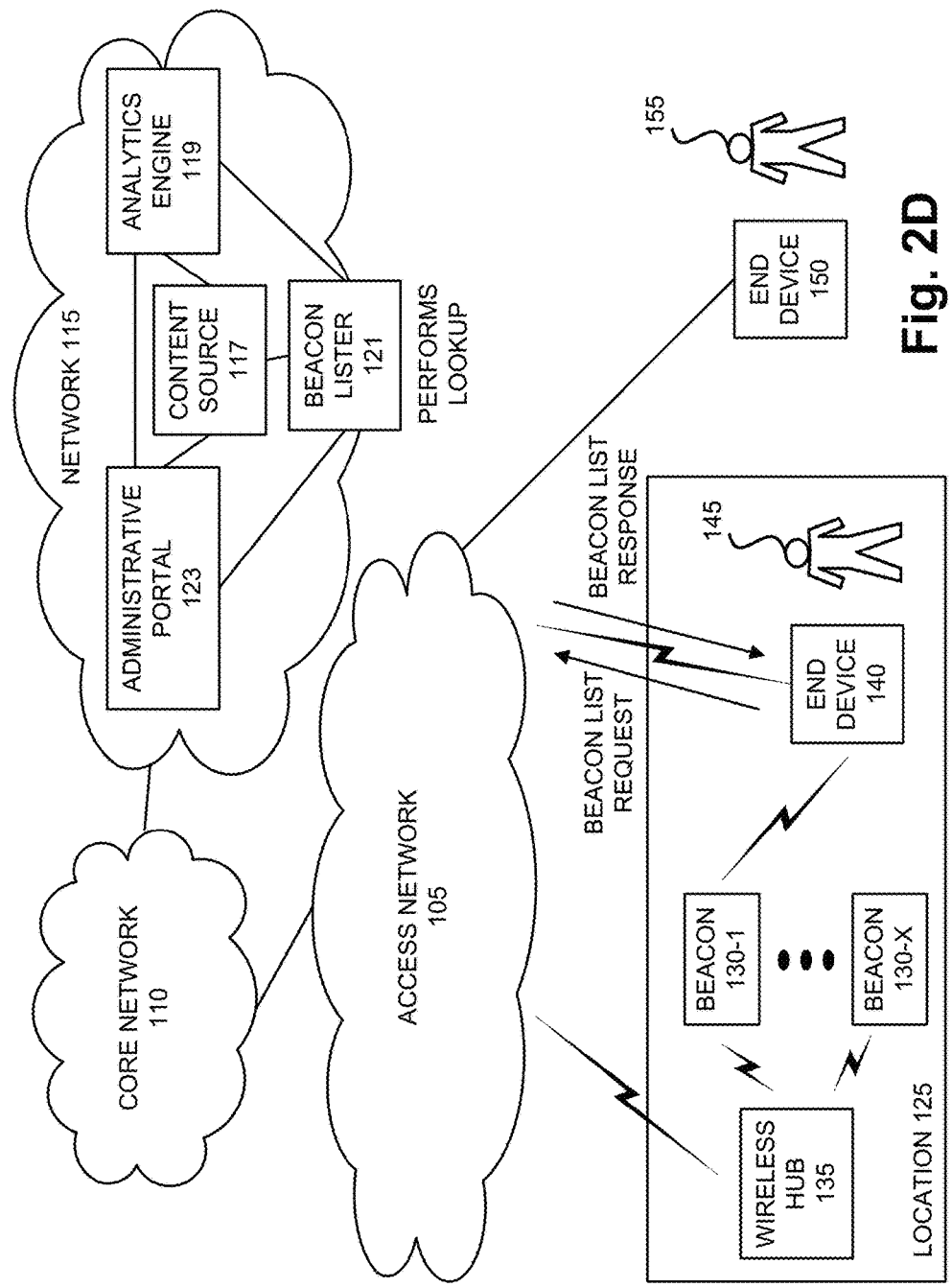

During one of the broadcasts, a beacon-enabled application at end device 140 detects the broadcast. In response, the beacon-enabled application stores the beacon identifier. Referring to FIG. 2D, the beacon-enabled application generates a request. The request includes the beacon identifier. The beacon-enabled application also stores a URI of beacon lister 121. As illustrated, end device 140 transmits a beacon list request to beacon lister 121. For example, end device 140 transmits the beacon list request via an LTE connection or other communication supported by access network 105. Beacon lister 121 receives the beacon list request. In response, beacon lister 121 performs a lookup. For example, beacon lister 121 queries list table 420. Beacon lister 121 determines whether the beacon identifier is valid or not based on a result of the lookup. For example, beacon lister 121 may determine whether the beacon identifier matches a beacon identifier included in one of profiles 434 (e.g., in beacon identifiers field 423). According to this example, assume that beacon identifier is included in one of profiles 434.

Based on the lookup result, beacon lister 121 generates a beacon list response that includes the beacon identifiers included in beacon identifiers field 423 of the one of profiles 434. Depending on the implementation, beacon list response may carry other data, in addition to the list of beacon identifiers (e.g., beacons 130). For example, the beacon list response may carry a URI from which contextual content may be obtained at content source 117. Alternatively, as previously described, the broadcast of beacon 130-1 may carry the URI from which contextual content may be obtained. In the case that beacon lister 121 is unable to match the beacon identifier, beacon lister 121 generates and transmits a beacon list response that indicates that the beacon identifier is not valid. For example, the beacon list response may carry a validity bit or flag that indicates whether a beacon identifier is valid or not.

Figure 2E:
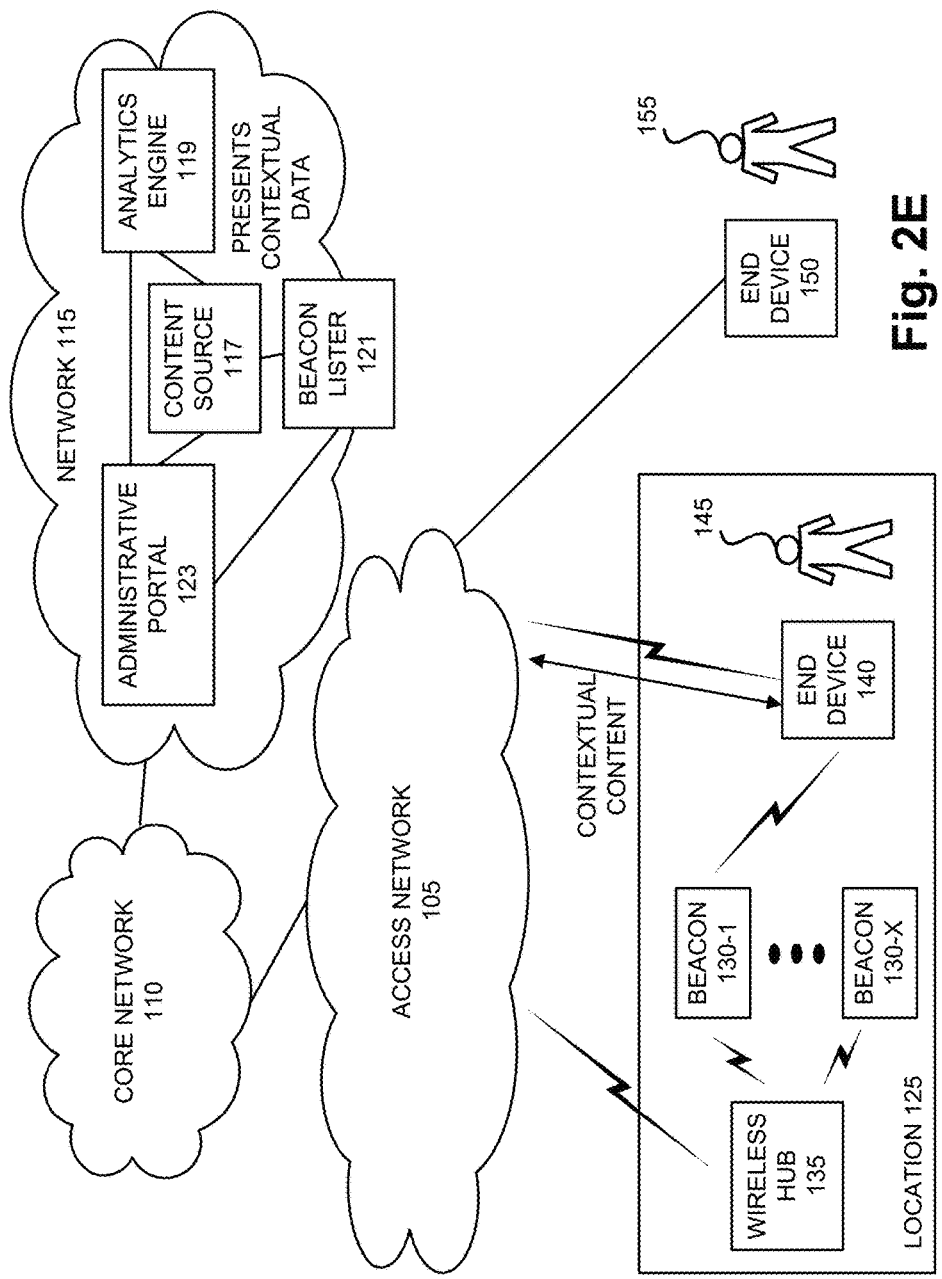

Continuing with this exemplary scenario, beacon lister 121 transmits the beacon list response, which includes the beacon identifiers, to end device 140. End device 140 receives the beacon list response. End device 140 may store any data carried in the beacon list response. Referring to FIG. 2E, based on the data carried in the beacon list response, the beacon-enabled application recognizes that the beacon identifier has been validated. As illustrated, end device 140 obtains contextual content from content source 117. For example, the beacon-enabled application of end device 140 may pull the contextual content from content source 117 based on a known URI. Alternatively, content source 117 may push contextual content to the beacon-enabled application of end device 140. For example, the network address of end device 140 may be made available to content source 117, by beacon lister 121, subsequent to validating the beacon identifier. The contextual content may be correlated to the location of beacon 130-1, a subset of beacons 130 to which beacon 130-1 belongs, location 125 in general, or some other configurable mapping.

Figure 2F:
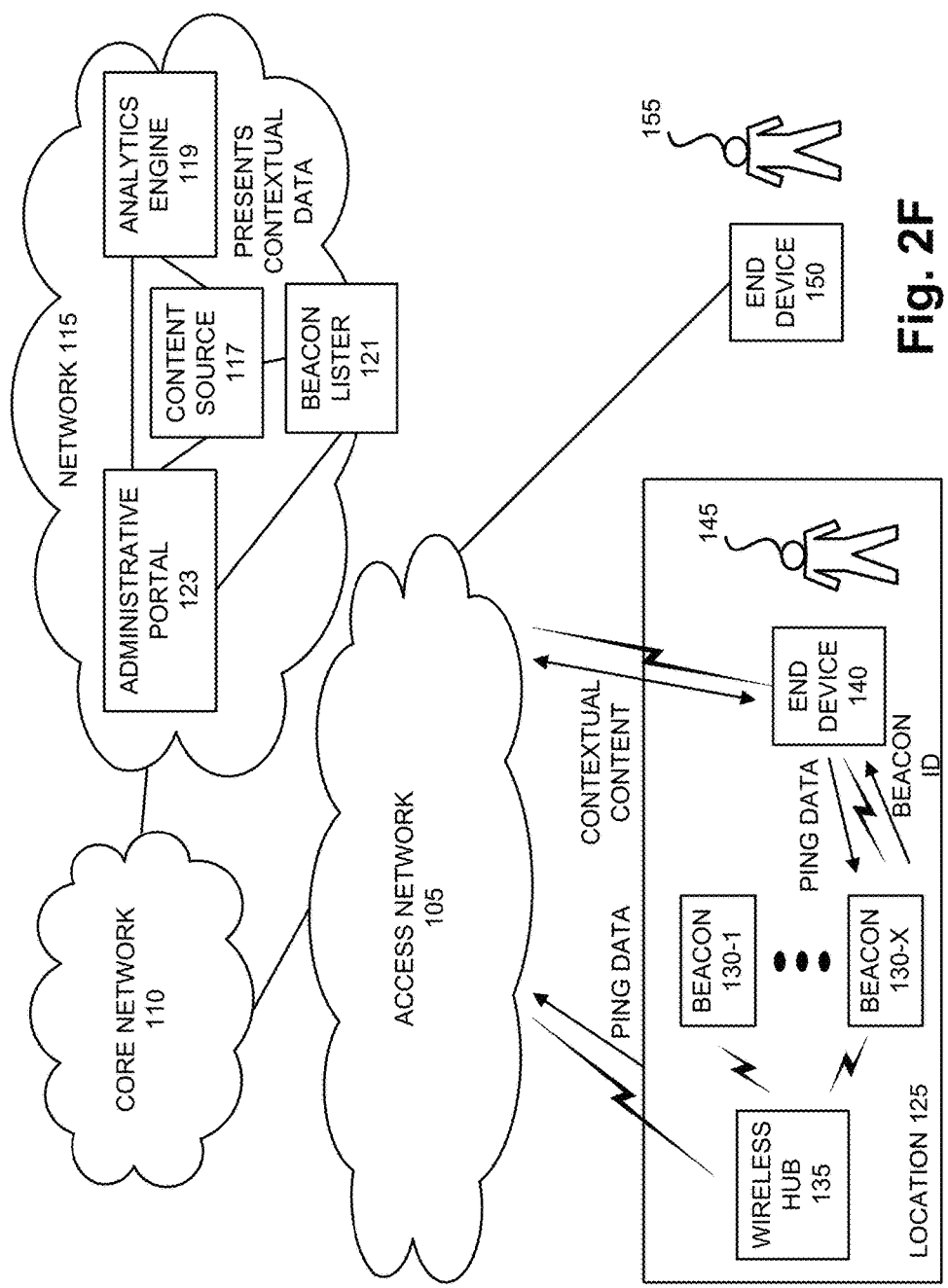

Referring to FIG. 2F, as user 145 roams within location 125 and encounters beacon 130-X, the beacon-enabled application may receive another broadcast from beacon 130-X. The beacon-enabled application validates the beacon identifier based on the list of beacon identifiers previously obtained from beacon lister 121. For example, the beacon-enabled application compares the beacon identifier obtained from the broadcast to a stored listing of beacon identifiers. When the beacon identifier, which is obtained from the broadcast, matches one of the stored beacon identifiers, the beacon-enabled application validates the beacon identifier and beacon 130-X. When the beacon identifier, which is obtained from the broadcast, does not match one of the stored beacon identifiers, the beacon-enabled application subsequently ignores the broadcasts from beacon 130-X.

According to this example, assume that the beacon identifier obtained from the broadcast is valid. In response, the beacon-enabled application generates and transmits ping data to beacon 130-X. The ping data may carry an end device identifier of end device 140 and/or a user identifier of user 145. The ping data may carry other data, such as date and timestamp data. Beacon 130-X receives the ping data. In response, beacon 130-X transmits the ping data to one or multiple backend network elements of the beacon system (e.g., content source 117, analytics engine 119, administrative portal 123, etc). In response to receiving the ping data, the network element may perform various tasks. For example, content source 117 may use the ping data to push additional contextual content to user 145 via end device 140 based on the particular locale of beacon 130-X (e.g., versus the locale of beacon 130-1). Additionally, or alternatively, analytics engine 119 may use the ping data to generate analytics data based on any number of analytics services described. End device 140 may continue to generate and transmit ping data to various beacons 130 as user 145 roams within location 125 and encounters various beacons situated therein. Although not illustrated, according to some exemplary implementations, when the beacon-enabled application determines that beacon 130-1 is a valid beacon (e.g., in FIG. 2D), end device 140 may also transmit ping data to beacon 130-1.

Although FIGS. 2A-2F illustrate exemplary processes pertaining to the management service and the beacon service, according to other embodiments and/or scenarios, a process may include additional operations, fewer operations, and/or different operations than those illustrated and described. For example, although not illustrated, analytics engine 119 may obtain session data pertaining to communications between end device 140 and other network elements of the beacon system (e.g., content source 117 and/or beacon lister 121). The session data may include an end device identifier of end device 140, a user identifier of user 145, contextual content received at end device 140, user interaction occurring during the presentment of contextual content (e.g., selections, etc.), location data (e.g., location 125), etc. Analytics engine 119 uses the session data to generate analytics data.

Figure 2G:
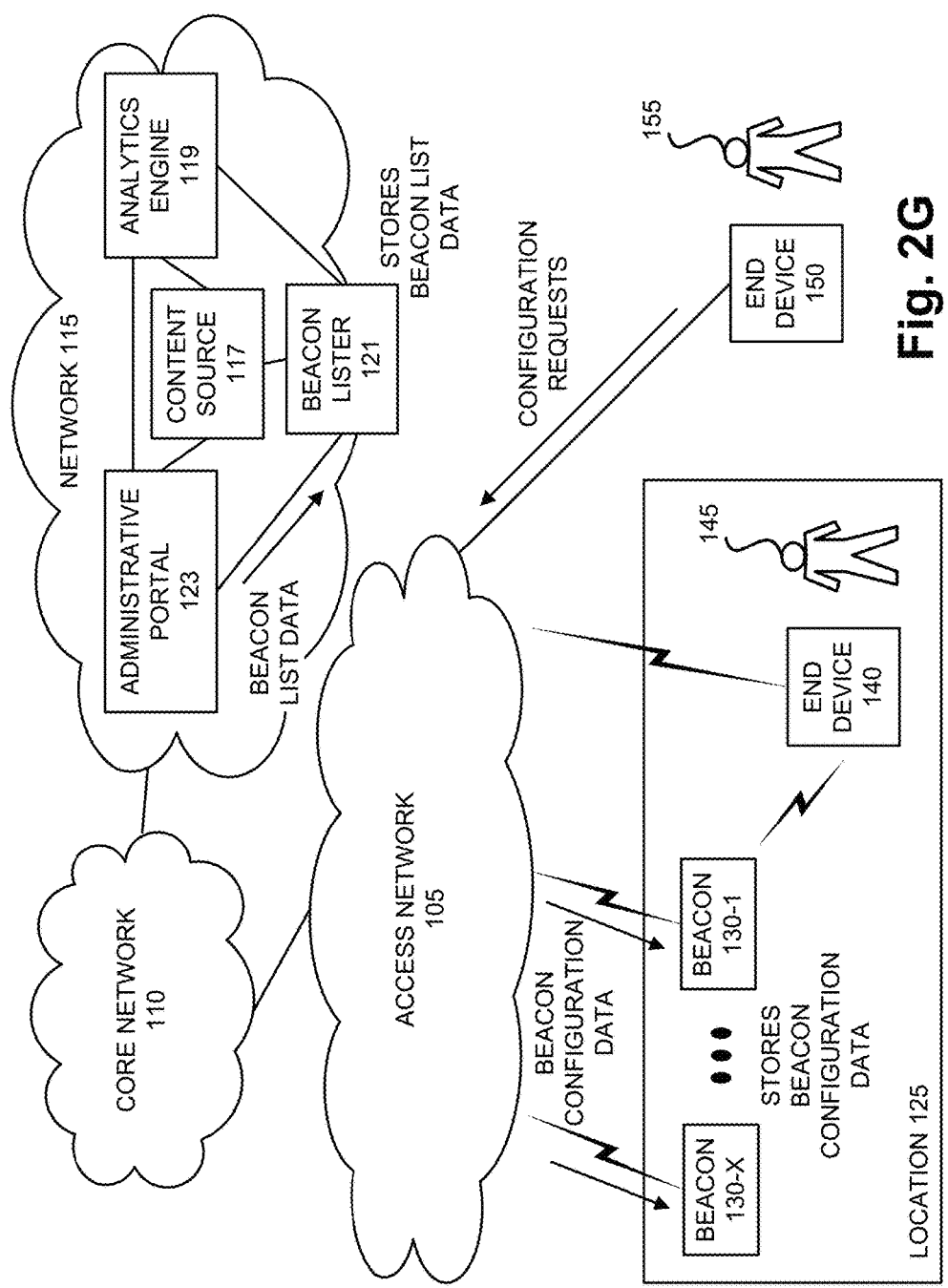
FIG. 2G is a diagram illustrating an exemplary scenario in which another exemplary embodiment of the management service of the beacon system may be implemented.

According to other exemplary embodiments, the beacon system does not include wireless hub 135. According to such embodiments, beacons 130 include a network-side communication interface supported by access network 105. Referring to FIG. 2G, according to a similar scenario as that previously described in relation to FIGS. 2A-2F, user 155 may configure beacons 130. As illustrated, beacons 130 may receive the beacon configuration data from access network 105.

FIG. 3 is a diagram illustrating exemplary components of a device 300. Device 300 may correspond to each of the network elements and end devices depicted in environment 100. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network elements that include logic to provide the management service, the analytics service, the broadcast service, etc., with respect to the beacon system, these network elements may be implemented to include software 320. Additionally, for example, end devices 140 and 150 may include software 320 (e.g., a beacon enabled application, an application to communicate to administrative portal 123, etc.) to perform tasks as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.). For example, with reference to beacon 130, end-device communication interface and network-side communication interface may each include communication interface 325.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 5:
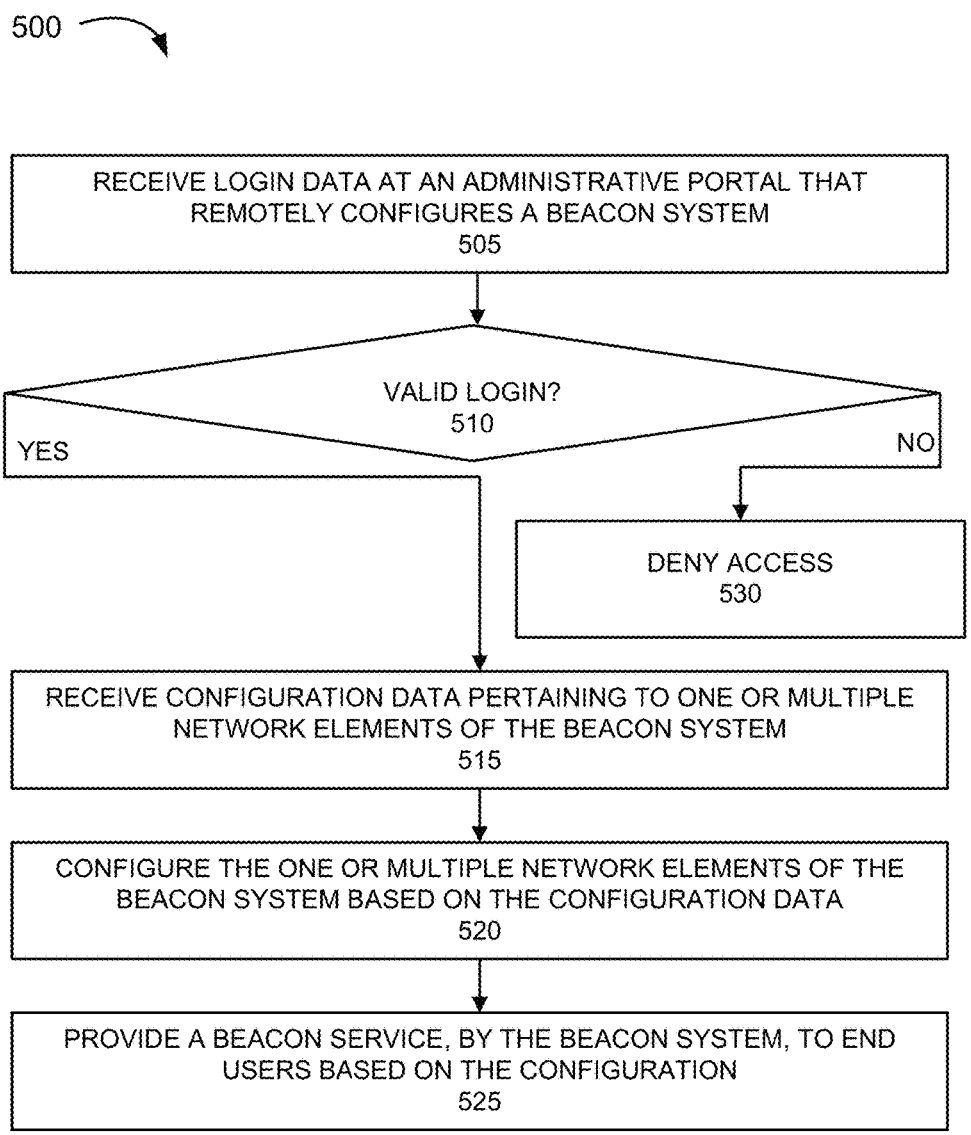
FIG. 5 is a flow diagram illustrating an exemplary process pertaining to a management service of the beacon system.

FIG. 5 is a flow diagram illustrating an exemplary process 500 pertaining to a management service of a beacon system. Process 500 is directed to processes previously described with respect to FIGS. 2A-2F, and elsewhere in this detailed description, in which the management service of the beacon system is provided.

Referring to FIG. 5, in block 505, process 500 may begin with receiving login data at an administrative portal. For example, user 155 may access administrative portal 123 via end device 150. Log in logic 441 of administrative portal 123 provides a graphical user interface that allows user 155 to sign into a management system of a beacon system. The management system allows user 155 to remotely configure (i.e., off-site from) the beacon system. User 155 enters user credentials (e.g., a user name and password) via the graphical user interface.

In block 510, it is determined whether the login data is valid. For example, administrative portal 123 determines whether the login data is valid based on a comparison of the login data to registered login data previously stored. When it is determined that the login data is valid (block 510—YES), configuration data pertaining to one or multiple network elements of the beacon system is received (block 515). For example, user 155 may navigate through various graphical user interfaces that allow user 155 to configure various network elements of the beacon system. For example, the network elements include content source 117, analytics engine 119, beacon lister 121, and/or beacons 130. As previously described, user 155 may select or provide various configuration data via administrative portal 123.

In block 520, one or multiple network elements of the beacon system are configured based on the configuration data. For example, administrative portal 123 is communicatively coupled to the one or multiple network elements of the beacon system. Administrative portal 123 transmits, installs, configures, etc., the configuration data or causes the network element to install or configure the configuration data at the network element. According to an exemplary embodiment, as previously described, beacon 130 includes a network-side communication interface via which the configuration of beacon 130 may take place.

In block 525, a beacon service is provided. For example, the beacon system provides a beacon service to users 145 via end devices 140 in accordance with the configuration. Referring back to block 510, when it is determined that the login data is not valid (block 510—NO), access to administrative portal is denied (block 530). For example, administrative portal 123 may indicate to user 155 that access to the management service is denied.

Although FIG. 5 illustrates an exemplary process pertaining to the management service of the beacon system, according to other embodiments, process 500 may include additional operations, fewer operations, and/or different operations than those illustrated in FIG. 5, and as described herein.

Figure 6:
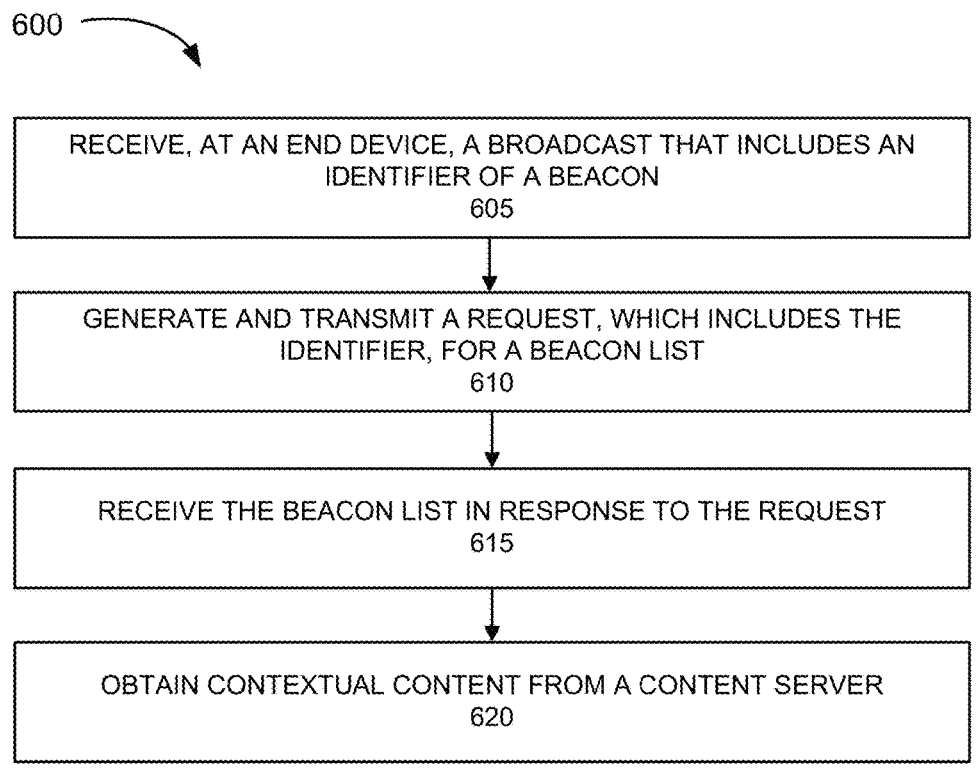
FIG. 6 is a flow diagram illustrating an exemplary process pertaining to a beacon service of the beacon system.

FIG. 6 is a flow diagram illustrating an exemplary process 600 pertaining to a beacon service of a beacon system. Process 600 is directed to a process previously described with respect to FIGS. 2A-2F, and elsewhere in this detailed description, in which the beacon service of the beacon system is provided.

Referring to FIG. 6, in block 605, a broadcast that includes an identifier of a beacon is received at an end device. For example, user 140 and end device 145 detects and receives a broadcast from beacon 130. For example, a beacon-enabled application includes logic to detect a broadcast from beacon 130. The broadcast carries a beacon identifier of beacon 130. According to one implementation, the broadcast carries a single beacon identifier. According to other implementations, the broadcast carries multiple beacon identifiers. The broadcast 130 may carry other data (e.g., advertising data, URI, etc.). The beacon-enabled application stores the beacon identifier. The beacon-enabled application may store other data carried by the broadcast.

In block 610, a request that includes the beacon identifier is generated and transmitted. For example, the beacon-enabled application generates a request to obtain a beacon list. The request includes the beacon identifier. The beacon-enabled application transmits via end device 140 the request to another device (e.g., beacon lister 121).

In block 615, a response to the request is received. It is assumed that the beacon identifier is a valid identifier. For example, the beacon-enabled application receives a response from beacon lister 121. The response includes a list of beacons 130 that are currently serving the beacon-enabled application. The response may also include a validity bit that indicates that beacon 130 is valid.

In block 620, contextual content is obtained. For example, the beacon-enabled application determines that beacon 130 has been validated based on the response (e.g., validity bit). The beacon-enabled application obtains contextual data from content source 117.

Although FIG. 6 illustrates an exemplary process pertaining to the beacon service of the beacon system, according to other embodiments, process 600 may include additional operations, fewer operations, and/or different operations than those illustrated in FIG. 6, and as described herein. For example, as previously described, end device 140 may transmit ping data to beacon 130.

Exemplary embodiments of the beacon system include an administrative portal that provides a platform for managing network elements of the beacon system remotely (i.e., off-site). For example, the network elements of the beacon system may be configured and/or updated, remotely and dynamically, to accommodate the delivery of content, as specified by user 155. As described herein, administrative portal 123 may allow user 155 to configure a network element on-the-fly or according to a schedule. This is in contrast to existing methodologies in which a person has to be on-site, with a mobile device, and in close proximity to the beacon. However, according to an exemplary embodiment, user 155 of administrative portal 123 may also manage the beacon system while on-site. For example, user 155 may use a mobile device at location 125 to configure beacons 130 or other network elements of the beacon system. By way of further example, the mobile device may include an Open Mobile-Alliance-Device Management (OMA-DM)/Diagnostics Client. The (OMA-DM) client at the mobile device may pull diagnostics information (e.g., malfunction data, trouble shooting data, etc.) from beacon 130. The mobile device may transmit the data obtained from beacon 130 to administrative portal 123. Additionally, user 155 may configure beacons 130 via the mobile device using conventional methods without communicating via administrative portal 123.

According to the beacon system described herein, a wide array of advertisers may be accommodated using the management service. For example, the advertisers may modify or update the beacon identifier stored and broadcasted by any beacon 130. Thereafter, end users 145 may obtain contextual content that pertains to the beacon-enabled application and corresponding beacon identifier. With this ability, it is possible to serve customized content from a wide array of advertisers to various end users 145. Additionally, with the ability to pinpoint the exact location of the end user 145 (e.g., relative to the location of a particular beacon 130), the beacon system may be provide a means to collect analytics data. For example, a marketer that is interested in the "take rate" may obtain analytics data that indicates the number of users 145 that respond to a half-time advertisement.

According to one embodiment, administrative portal 123 and management service may be offered by a service provider to other entities that may own, operate, rent, or manage beacons 130. The management service may provide a turn-key/off-the-shelf approach in which the management service can be offered "as-is" to potential subscribers without any installation, development, and management effort. Additionally, the subscriber may also subscribe to, for example, a hosted and/or Internet-based solution to provide contextual content. Alternatively, the subscriber may wish to manage and/or control the contextual content delivered via the beacon system. According to one business model, beacons 130 owned or operated by one entity, may allow another entity (e.g., vendors) a timeshare of their beacon systems. For example, scheduling logic 456 of administrative portal 123 may allow a timeshare of beacons 130 in which beacons 130 may broadcast beacon identifiers pertaining to a particular vendor according to a schedule. Beacons 130 may be configured and/or updated according to the schedule and configuration data obtained from a particular vendor.

Exemplary embodiments of the beacon system can provide end users 145 with "live" updates of information via their end devices 140. Beacons 130 may be deployed in various locales, such as transportation hubs, sports arenas, convention centers, retail outlets, hospitals, etc., and may provide users 145 via their end devices 140 with current, real-time or near real-time information, such as notifications on departures, delays, gate and platform assignments, game schedule changes, seminar schedule changes, etc. Additionally, beacon 130 that includes a network-side communication interface (e.g., an LTE interface, etc.) may enable the delivery of richer, hyper local content via crowd sourcing. For example, data gathered (e.g., ping data) from a particular set of end devices 140 may be analyzed for common elements. The analytics data may also be made available to participating facilities. Other data may be gathered, such as user preferences, how many users 145 launched a beacon-enabled application, user specific data, such as demographics, income levels, and human traffic patterns pertaining to a particular location (e.g., location 125).

The foregoing description of embodiments provides illustration, but is not intended to be exhaustive or to limit the embodiments to the precise form disclosed. Accordingly, modifications to the embodiments described herein may be possible. For example, the beacon-enabled application may select a URI pertaining to contextual content, from among multiple URIs, based on a received signal strength indicator (RSSI) associated with a received broadcast from beacon 130. According to such an implementation, the closer user 145 is relative to beacon 130, end device 140 may receive different contextual content. According to one example, the different contextual content may be such that as user 145 is closer to beacon 130, and correspondingly the RSSI is greater, user 145 receives different contextual data. According to such an implementation, the broadcast from beacon 130 may carry multiple URIs. The beacon-enabled application may store the URIs in response to receiving the broadcast. Subsequent to the beacon-enabled application determining that the beacon identifier of beacon 130 is valid, the beacon-enabled application maps the RSSI to one of the URIs. For example, the order of the URIs received during the broadcast may correspond to an ordering or magnitude of the RSSI. For example, when a two tier schema is used, the beacon-enabled application includes logic to compare the RSSI to two different RSSI threshold values in order to select from which of the two URIs to use to obtain the contextual content. By way of further example, assume that the broadcast pertains to a food vendor located at a sports stadium. When user 145 is at an outer distance from beacon 130, and the RSSI is of a low value, the URI pertaining to the contextual content may provide user 145 with the entire menu of the food vendor. When user 145 is at an inner distance from beacon 130, and the RSSI is of a higher value, relative to the lower value, the URI pertaining to the contextual content may provide user 145 with specials and discounts of food items offered by the food vendor.

According to another exemplary implementation, in view of the exemplary scenario just explained, the closer user 145 is relative to beacon 130, end device 140 may receive personalized, contextual content pertaining to user 145. For example, assume as described above, end device 140 presents the entire menu of the food vendor, and subsequently, as user 145 moves closer to beacon 130, end device 140 presents specials and discounts of food items offered by the food vendor. Now, further assume, as user 145 moves even closer to the food vendor and is waiting in a line to place an order, the beacon-enabled application of end device 140 determines that the RSSI value is extremely high and/or that the RSSI value is static over a threshold time period. For example, the RSSI value may remain static at a high value due to user 145 standing in line and being in close proximity to beacon 130. In response to the RSSI value, the beacon-enabled application includes logic to transmit ping data to beacon 130, which is received by analytics data 119. The ping data may carry data similar to that previously described in relation to FIG. 2F. According to one implementation, the ping data may carry a flag bit. The flag bit may indicate a request for personalized, contextual content.

In response to receiving the ping data, analytics engine 119 queries contextual content pertaining to the food vendor based on a user profile of user 145. According to this example, assume that the user profile indicates a favorite food of user 145. Additionally, assume that the menu of the food vendor carries the favorite food of user 145. As a result of the query, analytics engine 119 identifies a URI of contextual data pertaining to the favorite food of user 145. For example, the vendor may pre-configure URIs that highlight certain categories of foods (e.g., pasta, fish, steak, etc.), which are mapped to contextual data stored at content source 117. Analytics engine 119 transmits a beacon configuration update to beacon 130 via administrative portal 123. The beacon configuration update may include the URI of the personalized, contextual content pertaining to the favorite food of user 145. Additionally, the beacon configuration update may include data that configures beacon 130 to unicast the URI to end device 140. Beacon 130 receives the beacon configuration update and updates itself. Thereafter, beacon 130 unicasts the URI to end device 140. Depending on the implementation, beacon 130 may unicast the packet(s) that carry the URI a pre-configured number of times (e.g., once, twice, etc.). During this time, beacon 130 may continue to provide its broadcasting service. For example, depending on the broadcasting parameters, beacon 130 may unicast the URI during time periods that beacon 130 is not broadcasting.

The beacon-enabled application at end device 140 receives the unicast. The beacon-enabled application obtains the personalized, contextual content at content source 117 and presents the personalized, contextual content to user 145 via a display of end device 140. When user 145 reaches the food vendor to place his or her food order, user 145 orders his or her favorite food.

According to still other exemplary embodiments, beacon 130 stores contextual content. In this way, the beacon-enabled application at end device 140 may obtain contextual content from beacon 130, instead of or in addition to, obtaining contextual content from content source 117. For example, referring back to FIG. 2A, according to exemplary embodiment, beacon 130 may communicate with content source 117, via the network-side communication interface, to obtain contextual content (e.g., through a push method, a pull method, a polling method, etc.). As an example, consider a scenario in which user 145 is running late and jogging in order to reach a gate in an airport terminal. Also assume that end device 140 includes a beacon-enabled application pertaining to an airline on which user 145 is using to fly to his or her destination. Unfortunately, the airline has recently changed the gate and the departure board has not been updated. However, the new gate information has been updated at content source 117. Additionally, in response to the update, content source 117 pushes the updated contextual content to beacon 130, which is stored by beacon 130. The updated contextual content includes the new gate information. Beacon 130 stores the updated contextual content and provides its broadcast service that includes the new gate information and its beacon identifier. Thereafter, user 145 eventually arrives at the gate and finds that no one is there. The beacon-enabled application receives the broadcast from beacon 130 and validates the beacon identifier. Upon successfully validating the beacon identifier, the beacon-enabled application presents the updated contextual content to user 145. User 145 views the contextual content and heads to the new gate.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIGS. 5 and 6, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
receiving, by a network device, login data from a user via a device, wherein the network device provides a beacon management service that includes logic that allows the user to configure a beacon system remotely and off-site relative to a location of the beacon system, wherein the beacon system includes one or more beacons;
determining, by the network device, whether the login data is valid;
presenting, by the network device, an interface that allows the user to configure the beacon system in response to determining that the login data is valid;
receiving, by the network device and from the user via the interface, beacon configuration data directed to the one or more beacons, wherein the beacon configuration data includes multiple beacon identifiers for each beacon and the multiple beacon identifiers pertain to multiple and different beacon-enabled applications of end devices, and wherein the beacon configuration data includes broadcast parameters that indicate a transmit power, a time period of a broadcast, and a timer interval between each broadcast, and the beacon configuration data configures an operation performed by the one or more beacons; and transmitting, by the network device, the beacon configuration data to the one or more beacons in response to receiving the beacon configuration data.

2. The method of claim 1, wherein the beacon configuration data includes at least one of security certificates or power states of the one or more beacons.

3. The method of claim 1, wherein the beacon system includes a beacon list server, and the method further comprises:

receiving, by the network device and via the interface, beacon list configuration data directed to the beacon list server, wherein the beacon list configuration data configures an operation performed by the beacon list server;

transmitting, by the network device, the beacon list configuration data to the beacon list server; and configuring the beacon list server based on the beacon list configuration data, wherein the beacon list configuration data includes the multiple beacon identifiers that uniquely identify the one or more beacons and the configuring comprises storing the multiple beacon identifiers.

4. The method of claim 1, further comprising:

receiving, by the network device and via the interface, scheduling data that indicates a date and a time to configure the one or more beacons, and wherein the transmitting comprises:

transmitting, by the network device, the beacon configuration data to the one or more beacons based on the scheduling data, wherein the date and the time is a date and a time subsequent to the user logging off the network device.

5. The method of claim 1, further comprising:

receiving, by the one or more beacons, the beacon configuration data via a network-side communication interface included in the one or more beacons; and configuring, by the one or more beacons, the one or more beacons according to the beacon configuration data.

6. The method of claim 5, wherein the network-side communication interface includes a Long Term Evolution (LTE) communication interface, and wherein the beacon configuration data includes advertisement data, the method further comprising:

broadcasting, by the one or more beacons during a single broadcast instance, the multiple beacon identifiers via an end-device communication interface, based on the broadcast parameters.

7. The method of claim 1, wherein the beacon system includes a content server that stores and presents contextual content, and the method further comprising:

receiving, by the network device and via the interface, content configuration data directed to the content server, wherein the content configuration data configures an operation performed by the content server;

transmitting, by the network device, the content configuration data to the content server; and configuring the content server based on the content configuration data.

8. The method of claim 1, wherein the beacon system includes an analytics engine that generates analytics data pertaining to end users of the beacon system, and the method further comprising:

receiving, by the network device and via the interface, analytics configuration data directed to the analytics engine;

transmitting, by the network device, the analytics configuration data to the analytics engine; and configuring the analytics engine based on the analytics configuration data.

9. A beacon system comprising:

beacons; and an administrative portal device that provides a beacon management service that allows a user to configure the beacons remotely and off-site relative to a location of the beacons, wherein the administrative portal device comprises:

a first communication interface;

a first memory, wherein the first memory stores first instructions; and a first processor, wherein the first processor executes the first instructions to:

receive, via the first communication interface, login data from the user via an end device;

determine whether the login data is valid;

present, via the first communication interface, an interface that allows the user to configure one or more of the beacons remotely and off-site relative to the location of the one or more beacons, in response to a determination that the login data is valid;

receive, via the first communication interface from the user via the interface, beacon configuration data directed to the one or more beacons, wherein the beacon configuration data includes multiple beacon identifiers for each beacon and the multiple beacon identifiers pertain to multiple and different beacon-enabled applications of end devices, and wherein the beacon configuration data includes broadcast parameters that indicate a transmit power, a time period of a broadcast, and a timer interval between each broadcast, and the beacon configuration data configures an operation performed by the one or more beacons; and transmit, via the communication interface, the beacon configuration data to the one or more beacons in response to the receipt of the beacon configuration data.

10. The beacon system of claim 9, wherein the beacon configuration data includes at least one of security certificates or power states of the one or more beacons.

11. The beacon system of claim 9, wherein the beacon system includes a beacon list server, and wherein the first processor further executes instructions to:

receive, via the first communication interface, beacon list configuration data directed to the beacon list server, wherein the beacon list configuration data configures an operation performed by the beacon list server; and transmit, via the first communication interface, the beacon list configuration data to the beacon list server, and wherein the beacon list server comprises:

a second communication interface;

a second memory, wherein the second memory stores second instructions; and a second processor, wherein the second processor executes the second instructions to:

receive, via the second communication interface, the beacon list configuration data; and configure the beacon list server in response to a receipt of the beacon list configuration data and in accordance with the beacon list configuration data.

12. The beacon system of claim 9, wherein the first processor further executes the first instructions to:
receive, via the first communication interface, scheduling data that indicates a date and time to configure the one or more beacons, and wherein when transmitting, the first processor further executes the first instructions to:
transmit, via the first communication interface, the beacon configuration data to the one or more beacons based on the scheduling data.

13. The beacon system of claim 9, wherein each of the beacons comprise:
a network-side communication interface;
an end-device communication interface; and
logic configured to:
receive, via the network-side communication interface, the beacon configuration data; and
configure the beacon according to the beacon configuration data.

14. The beacon system of claim 13, wherein the network-side communication interface includes a Long Term Evolution (LTE) communication interface, and wherein the beacon configuration data includes advertisement data, the logic of each of the beacons is further configured to:
broadcast, via the end-device communication interface, the multiple beacon identifiers based on the broadcast parameters, wherein the end-device communication interface is one of Bluetooth communication interface, a low radio frequency communication interface, or an optical wireless communication interface.

15. The beacon system of claim 9, wherein the beacon system includes a content server that stores and presents contextual content to end users of the beacon system, and wherein the first processor further executes instructions to:
receive, via the first communication interface, content configuration data directed to the content server, wherein the content configuration data configures an operation performed by the content server; and
transmit, via the first communication interface, the content configuration data to the content server, and wherein the content server comprises:
a third communication interface;
a third memory, wherein the third memory stores third instructions; and
a third processor, wherein the third processor executes the third instructions to:
receive, via the third communication interface, the content configuration data; and
configure the content server in response to a receipt of the content configuration data and in accordance with the content configuration data, wherein the content configuration data includes the contextual content and a URI of the contextual content.

16. The beacon system of claim 9, wherein the beacon system includes an analytics engine that generates data pertaining to end users of the beacon system, and wherein the first processor further executes instructions to:
receive, via the first communication interface, analytics configuration data directed to the analytics engine, wherein the analytics configuration data configures an operation performed by the analytics engine; and
transmit, via the first communication interface, the analytics configuration data to the analytics engine, and wherein the analytics engine comprises:
a fourth communication interface;
a fourth memory, wherein the fourth memory stores fourth instructions; and
a fourth processor, wherein the fourth processor executes the fourth instructions to:
receive, via the fourth communication interface, the analytics configuration data; and
configure the analytics engine in response to a receipt of the analytics configuration data and in accordance with the analytics configuration data.

17. A non-transitory, computer-readable storage medium storing instructions executable by a processor of a computational device, which when executed cause the computational device to:
receive login data from a user via an end device;
determine whether the login data is valid;
present an interface that allows the user to configure one or more beacons remotely and off-site relative to a location of the one or more beacons, in response to a determination that the login data is valid;
receive beacon configuration data from the user via the interface directed to the one or more beacons, wherein the beacon configuration data includes multiple beacon identifiers for each beacon and the multiple beacon identifiers pertain to multiple and different beacon-enabled applications of end devices, and wherein the beacon configuration data includes broadcast parameters that indicate a transmit power, a time period of a broadcast, and a timer interval between each broadcast, and the beacon configuration data configures an operation performed by the one or more beacons; and
transmit the beacon configuration data to the one or more beacons in response to the receipt of the beacon configuration data.

18. The non-transitory, computer-readable storage medium of claim 17, wherein the beacon configuration data includes at least one of security certificates or power states of the one or more beacons.

19. The non-transitory, computer-readable storage medium of claim 17, wherein the instructions further comprise instructions to:
receive beacon list configuration data directed to a beacon list server, wherein the beacon list configuration data configures an operation performed by the beacon list server; and
transmit the beacon list configuration data to the beacon list server.

20. The non-transitory, computer-readable storage medium of claim 17, wherein the instructions further comprise instructions to:
receive analytics configuration data directed to an analytics engine, wherein the analytics configuration data configures an operation performed by the analytics engine; and
transmit the analytics configuration data to the analytics engine.

* * * * *